United States Patent [19]
Gilbert

[11] Patent Number: 4,733,223
[45] Date of Patent: Mar. 22, 1988

[54] APPARATUS FOR MONITORING A COMMUNICATIONS SYSTEM

[76] Inventor: William C. Gilbert, 8625 E. Valley Vista Dr., Scottsdale, Ariz. 85253

[21] Appl. No.: 31,084

[22] Filed: Mar. 26, 1987

[51] Int. Cl.⁴ .......................... G08B 26/00; H04B 3/00
[52] U.S. Cl. .................................... 340/505; 340/531; 340/533; 340/536; 340/825.08; 340/825.54; 358/86; 375/36; 379/49; 455/3; 455/21
[58] Field of Search ............... 340/505, 506, 508, 518, 340/531, 533, 536, 538, 825.06–825.13, 825.21, 825.54, 870.07, 870.09, 870.18; 358/86, 10, 122, 139; 375/36, 7; 379/49; 455/3–9, 20, 21, 14–17, 63

[56] References Cited
U.S. PATENT DOCUMENTS

| 3,737,858 | 6/1973 | Turner et al. | 340/505 |
| 4,198,624 | 4/1980 | Watanabe | 340/505 |
| 4,477,799 | 10/1984 | Rucci et al. | 340/505 |

Primary Examiner—Donnie L. Crosland
Attorney, Agent, or Firm—Joseph H. Roediger

[57] ABSTRACT

Apparatus for monitoring the status of and controlling faults at remotely-located components in a single line communications system wherein return data signals from the components are transmitted in the 50 kHz to 200 kHz range, and coupled to the low pass filters commonly used to bypass the active components, thereby permitting the return of signals to the system head-end.

15 Claims, 6 Drawing Figures

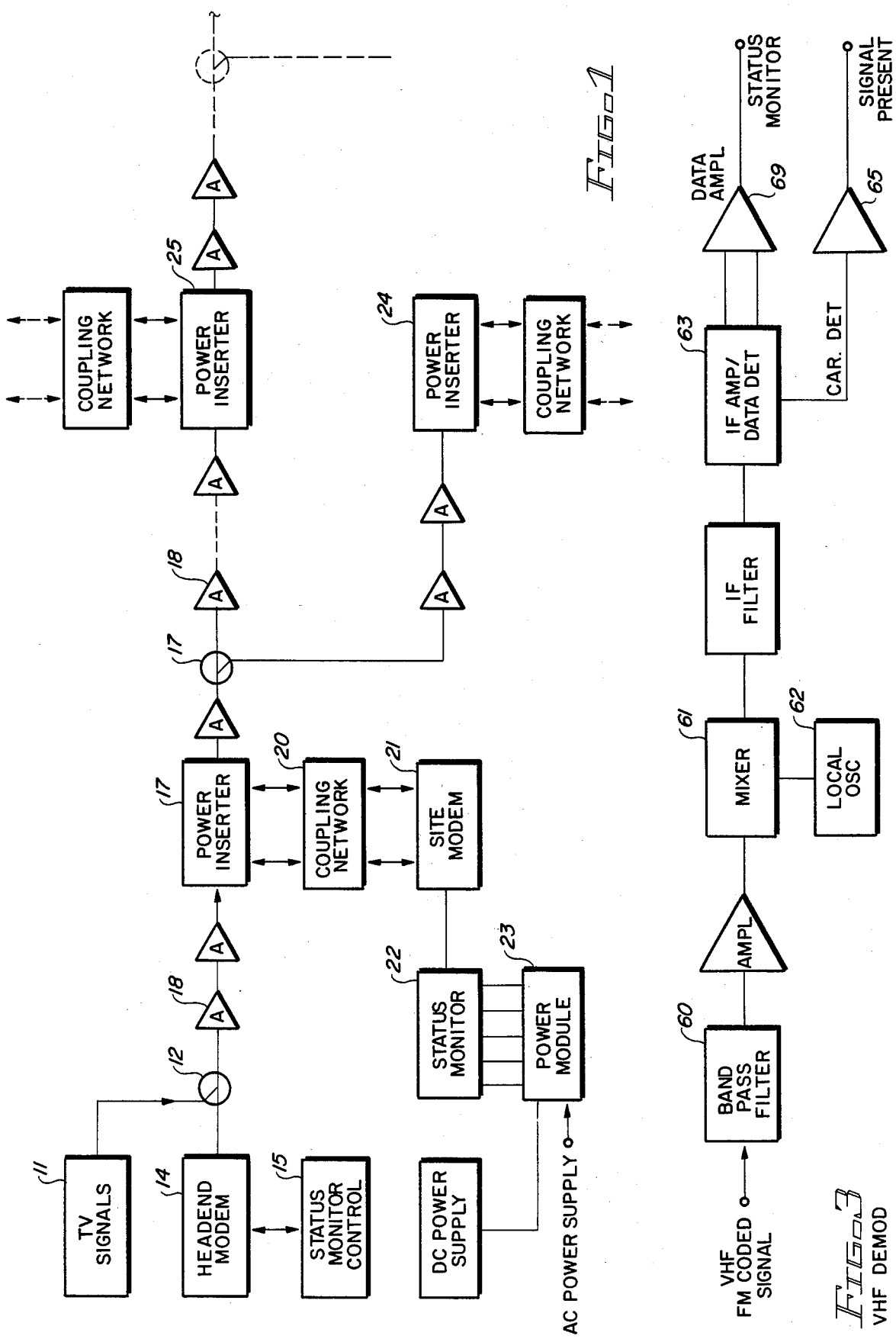

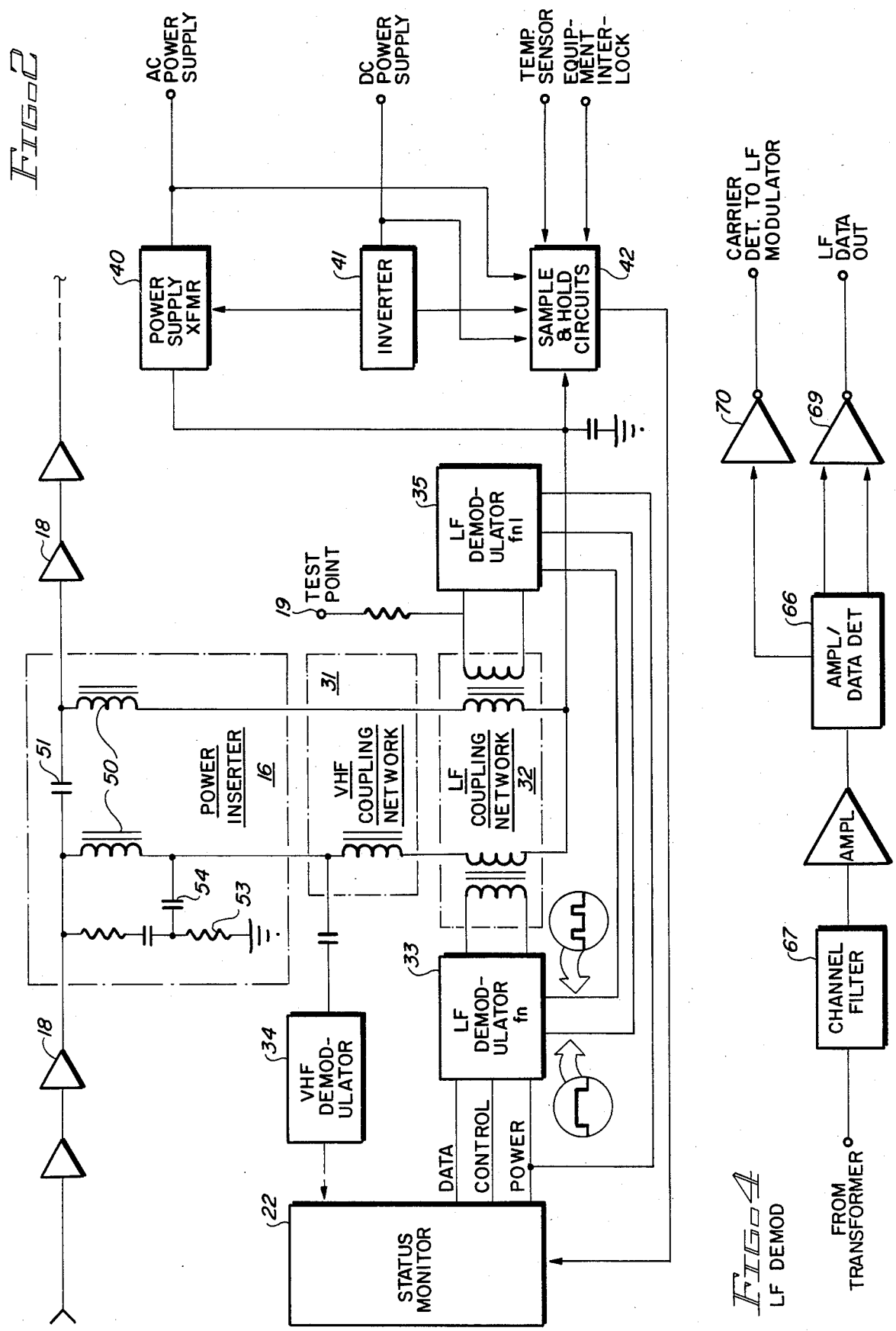

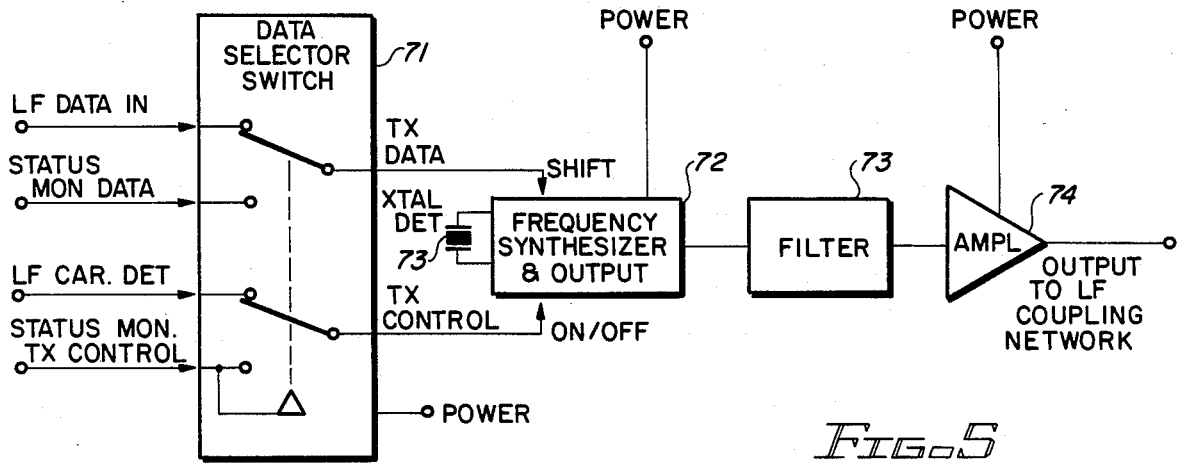
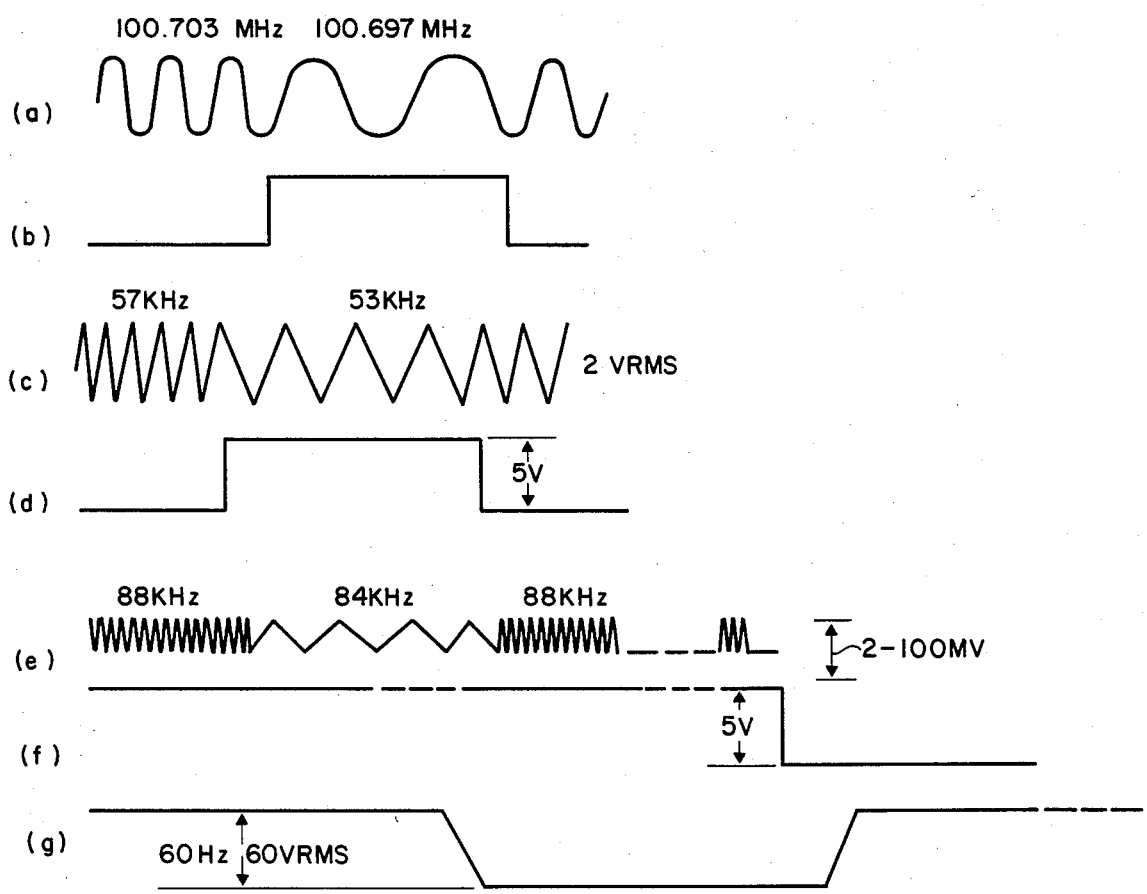

APPARATUS FOR MONITORING A COMMUNICATIONS SYSTEM

BACKGROUND OF THE INVENTION

This invention relates to a single-line communications system wherein the status of remote components is monitored by return signals transmitted to the system head-end along the single transmission line.

In communications systems, such as a CATV system, wherein information signals are sent from a central point to a number of remote locations, it is important for system reliability to be able to periodically monitor the operational status of the different system components placed along the transmission path. Since communications systems of significant length require the introduction of power at various locations along their lengths to power components which compensate for attenuation along the line, the status of the power supplies and any standby equipment associated therewith must be continually monitored and evaluated so that prompt corrective action can be taken to provide continuous operation throughout the system. A cable television system employs a main cable originating at the head-end where the information signals are introduced with branch cables extending outwardly therefrom with intermediate amplifying devices distributed throughout the entire system. These distributed amplifiers are necessary to compensate for transmission lines losses and attenuation, plus any noise signals introduced from the power supplies so that the signal received by the furthest subscriber is substantially equivalent to that received by a subscriber proximate to the system head-end.

Initially, cable television systems required individual cable subscribers to report malfunctions at their localized reception point by means other than the system itself, such as by telephone. The location of the subscriber reporting a non-functioning display terminal which was closest to the head-end site was utilized to determine where to look for the fault. Repair personnel were dispatched to this point and began to track back through the system. The process was time consuming and the lengthy disruptions of programming to subscribers resulted in a reduction in subscriber renewals and made the enlisting of new subscribers difficult. An alternative approach to localizing faults that has been tried in the past relied on the transmission of a unique test signal through the cable system while maintenance personnel tapped into the cable at a variety of points to monitor the test signals. Faults were then localized between test points. When possible, this testing program was conducted during periods of minimal or low subscriber usage since it frequently resulted in interference with the information signals being transmitted.

In the case of industrial communication systems utilizing a number of remotely located terminal points to receive and display information, the two-cable system has been generally adopted as a way to provide for the independent transmission of status signals generated at the terminal points. Since these status signals are carried by the second or parallel cable, they do not interfere with transmitted data on the primary cable and are readily received at a monitoring station at the head-end. However, the duplication of transmission lines in a single facility without increasing system capacity when combined with the need to power this second line, substantially increases the capital investment necessary to install such a system. The required investment for a dual cable system is also increased by the need for repeaters in the return path to insure that an intelligible return signal reaches the head-end.

Dual transmission path systems have been preferred to systems using the frequency separation of the information signal transmitted to the subscribers from the monitoring signal at a lower frequency along the same cable since the risk of interference therebetween is eliminated. In the event that a single cable signal is used in the reverse direction for the transmission of monitoring signals, the head-end must deal with the reception of a multiplicity of different signals from non-uniquely addressed terminal points. The identification of the signals as originating from a particular terminal point has proved to be more difficult than anticipated. As a result, these systems have not been widely used in the cable television industry. Furthermore, the use of a single cable for split frequency systems requires the placement of both high pass filters for the transmission of the information signals and a multiplicity of low pass filters to split the band for the return signals. Since these filters are needed at each amplification point in the system, the resultant losses introduced cause the system to need additional amplification, more power and thus create more opportunities for system failure. Thus, the maintenance on the split frequency band communications systems rises significantly.

Accordingly, it is a primary object of the present invention to provide a single cable communications system which permits remotely-located components to be individually addressed and controlled with the responses carried back to the head-end on the single cable without the need for increased amplification.

Another object of the invention is to provide isolation between opposing sides of the transmission line at the site of the remotely-located components being monitored. Further, the system utilizes the existing standby power supplies in a cable system as the sites for repeaters which maintain the signal level of the return monitor signals.

A further object is the provision of a modem/repeater component for reverse transmission in a single cable system which is capable of being retrofit into existing cable systems without requiring substantial redesign thereof.

SUMMARY OF THE INVENTION

This invention relates to a single cable communications system which provides status monitoring of remotely located components distributed between the head-end and the furthest user of a transmitted information signal.

The communications system includes a head-end site from which the information signal is transmitted along a single cable extending through a network of branches to a multitude of downstream user locations. The head-end site includes the means for introducing the information signals into the cable, a transmitting means for introducing the address signals referring to specific remotely located components and the receiving means for processing returned signals therefrom. A multiplicity of amplifiers are distributed along the signal cable at intervals based on the cable loss characteristics along with signal splitting components of conventional type to create additional single cable branches for serving additional users.

A number of power inserters are coupled between the cable and a primary power supply, typically the adjacent utility line from which power is available to the system. At each location, a standby power source is provided through a coupling network to a power inserter coupled to the transmission line. The coupling network is provided with modem means which receives both the address signal and low frequency status signals being returned toward the head-end. The power inserter maintains substantial isolation between these signals on its opposing VHF and LF input terminals so that status signals are received from downstream and repeated for transmission upstream. If no status signal is available at a downstream component having a given address, the head-end interrogation process continues after noting the absence of a status signal at said location and the downstream modems continue to be interrogated via their coupling networks and power inserters.

The power inserter provides isolation between the head-end input terminal and the downstream input terminal for low frequency signals. However, a portion of the VHF signal containing the address is obtained from the transmission line at each power inserter to activate this location in the system, and initiate the transmission of data at of the lower frequency. The LF modulator at each location is provided with a specific frequency for the transmission of data upstream to the next location. Each power inserter is provided with a demodulator operating at the frequency of the downstream modulator and a modulator having a different frequency. The data is transmitted by frequency shift keying techniques incorporating binary data within the LF signal.

On the upstream or head-end side of the power inserter, a low frequency LF coupling network is coupled to a modulator for coding a low frequency signal with status information obtained from sampling circuits which are connected to a status monitor circuit. The status monitor circuit is activated by the presence of the VHF signal in the power inserter to receive a coded address signal from the transmitting means at the head-end. This monitor receives the polling signals from the head-end and decodes them to determine if this location is being addressed. If it is so determined, this status monitor modulates a low frequency signal for return on the head-end side of the power inserter. In the event that the address is not for this location, the VHF signal is supplied through the LF isolation means of the power inserter to another downstream location wherein an identical sequence is taking place.

At any addressed location, the signals from the status monitor are used to modulate a low frequency carrier Fn and are transmitted toward the head-end. Since this location is normally not adjacent the system head-end, another power inserter is encountered from the downstream side. The signal Fn is demodulated and a new signal Fn1 is modulated on the head-end side for transmission. The lower level of each signal moving upstream is reinforced at each power inserter location to ensure that the signal is intelligible when it reaches the head-end receiving means. The LF signal isolation is maintained by utilizing frequency separation for the low frequency signals propagating toward the head-end of the transmission line.

The status monitor is coupled to the demodulator which processes signals from downstream so that upon recognition of its unique address in the signal transmitted from the head-end, a disabling of the demodulator occurs and no received signals are processed thereby and the integrity of the signals from this site is maintained. The frequency of each demodulator is set to match that of the next succeeding modulator along the line. In the case of a line split into branches, the frequency of the modulator at the first power inserter of each branch is matched.

In the event that data returning to the receiver at the head-end is indicative of a high temperature, loss of ac supply, low dc standby battery voltage or other condition, the location of the problem is established and the necessary steps taken. However, if the returning data is indecipherable, the operator then polls all power inserter locations to determine which location is on. An unique signal is then transmitted to that address to disable the faulty status monitor. The LF modulator and LF demodulator continue operating to pass information from other locations toward the head-end.

The power inserter of the present invention couples the necessary power into the transmission line from either the ac supply or a dc standby supply to compensate for signal degradation with the power flowing in both upstream and downstream directions from each location. Typically, ac power is supplied from a utility line connection wave-shaped to provide a 60 Hz square wave. The standby power is provided by a local battery with an inverter associated therewith to provide a similar signal. The upstream LF signals are superimposed on the 60 Hz power signal with modulation of the carrier at each location occurring through frequency shift keying FSK techniques. The superimposed signal frequencies are maintained at less than 200 kHz. The frequency differences between adjacent power inserters need be a minimum of three to achieve directivity and sufficient band width is available to permit frequency shift keying at three separate center frequencies without interference therebetween.

Further features and advantages of the invention will become more readily apparent from the following detailed description of a preferred embodiment when taken in conjunction with the accompanying drawings.

DESCRIPTION OF THE DRAWINGS

FIG. 1 is a block schematic diagram of a CATV signal utilizing the present invention;

FIG. 2 is a block schematic in further detail of a preferred embodiment of the invention.

FIG. 3 is a block schematic diagram of the VHF demodulator of the embodiment shown in FIG. 2.

FIG. 4 is a block schematic diagram of the LF demodulator shown in FIG. 2.

FIG. 5 is a block schematic diagram of the LF modulator shown in the embodiment of FIG. 2.

FIG. 6 shows a series of wave-forms at various points throughout the embodiment of FIG. 2.

DESCRIPTION OF THE PREFERRED EMBODIMENTS

Referring now to FIG. 1, a single-line communication system is shown utilizing the teachings of the present invention and includes a source of information signals to be transmitted to a number of remotely-located receivers. The embodiment shown is directed to a cable television CATV wherein the television signals originate at the source 11, typically coupled to a master antenna and are coupled to the main trunk by directional coupler 12. The main trunk is a coaxial cable which is later subdivided by additional signal splitters to feed a plurality of branches. Also, a head-end modem 14 is connected to the end of the trunk cable. The head-end modem transmits signals utilized to address a number of remotely located components connected along the transmission lines comprising the system and also to receive signals transmitted therealong in the reverse direction toward the head-end. The head-end modem 14 is a conventional modulator-demodulator component receiving and sending signals to status monitor control 15. A number of amplifiers 18 are located along the coaxial cable at predetermined intervals to compensate for attenuation and line losses as the distance increases from the head-end.

The amplifiers and other components distributed along the CATV system consume power and thus it is common for power insertion to occur at various points along the system. In the embodiment shown, a power inserter module 16 is connected in the coaxial cable and is coupled to both an ac power supply and a standby dc power supply through coupling network 20, site modem 21, status monitor 22 and power module 23 which interfaces with the two power supplies. Typically, the ac power supply is derived from a utility line located on the same power pole as the cable. The standby dc supply which is operational upon loss of utility power is also mounted thereon in a water-proof housing containing the power inserter and supporting components. As shown in FIG. 1, this sequence is repeated along the continuation of the trunk line and any branch lines such as shown splitting off from the main trunk at coupler 17. In operation, the power derived from a particular location is coupled into the center conductor of the coaxial cable and provides power for adjacent amplifiers, both upstream and downstream therefrom. It is to be noted that the term "upstream", as used in this specification, defines a direction toward the head-end.

The VHF television signals propagate along the coaxial cable to the multiplicity of users and are amplified by amplifiers 18 spaced therealong. The amplifiers, in turn, are powered by the external power injected through the power inserters periodically located along the trunk and branches. In the event that power failure or equipment breakdown occurs at a point along the system, the operator at the head-end location is desirous of learning not only of the existence of the breakdown, but the actual location thereof. Furthermore, it is important that the operator of the system be made aware of components located at points throughout the system that are likely to experience failure in the near term so that preventive maintenance can take place to ensure that subscribers enjoy uninterrupted signal availability. The present invention is directed to providing a means for the cable operator, located at the head-end, and observing the monitor control 15 to receive information signals regarding the status of components at each power inserter location throughout the system. Thus, repair personnel can be rapidly dispatched to a specific location to carry out the required corrective actions necessary to maintain the integrity of the system.

In operation, the head-end modem provides a VHF carrier at a frequency of 100 mHz which is modulated by frequency shift keying techniques in accordance with the address codes provided by status monitor control 15. Thus, the information is encoded on the carrier in digital form. Each power inserter 16 is provided with an individual address and the status monitor control 15 continually generates the sequence of addresses of the power inserter locations. As shown in FIG. 1, the television signals are introduced into the cable at the directional coupler 12 so that the television and address signals are contained on the VHF carrier. As the signal propagates along the transmission line, it is amplified by the appropriately located amplifiers and reaches the first power inserter 16. The signal is coupled out of the power inserter by coupling network 20 into a site modem 21. Since the television signal is not to be displayed at the power inserter location, only a small portion of the signal need be coupled out to permit the site modem to demodulate the VHF coded signal. This small portion of the signal in the transmission line is decoded to determine if this specific location has been addressed at this particular time interval. If this address does not correspond to this location, the major portion of the VHF signal is continuing downstream on the transmission line, further amplified by amplifiers 18, and it encounters the particular power inserter corresponding to the addressed location.

In the event the address corresponds with this location, the site modem having demodulated the VHF signal then modulates a low frequency LF signal in the 50 to 200 kHz range with the information contained on the status monitor 22. As shown, the status monitor is provided with a number of inputs coupled to the power module for monitoring the status of the ac and dc power supplies, the temperature and security of the equipment at that location. The status monitoring can be continual with data stored to be immediately available when the location has been addressed. Each site modem contains low frequency oscillators, typically in the range of 50–200 kHz, and utilizing frequency shift keying encodes the digital information on the LF carrier for introduction into the transmission line via the coupling network 20 and the power inserter 16.

A shown in FIG. 2, the power inserter 16 includes means for providing relative isolation at these LF frequencies by introducing the LF signal on the upstream side of blocking capacitor 51. The coupling network directs the output of the site modem into the head-end portion of the power inserter for transmission back to the head-end modem 14 where it is demodulated and supplied to the status monitor control 15 for operator review.

The transmission of the encoded information on a low frequency carrier to a single power inserter location requires only that the LF modulator at this site provide a carrier frequency that is equivalent to the one expected at the head-end modem 14. However, the system is designed for use with cable television systems wherein a large number of power inserters are commonly utilized. As a result, the system is required to provide means for uniquely identifying the site from which this information is originating. Consequently, the signals transmitted along the cable toward the head-end are coupled out of the power inserter and into the coupling network to the site modem at each adjacent upstream location.

Each site modem is provided with a LF demodulator responsive to a different carrier frequency than its LF modulator, which carrier frequency is the same as that of the next adjacent downstream power inserter. In practice, three frequencies are utilized for the LF carrier at successive locations in the cable system. The foregoing discussion has referred to the first power inserter 16. The next downstream power inserter in the sequence is provided with a site modem having an LF oscillator which operates at a slightly different frequency than the LF modulator at the adjacent upstream and downstream locations. The LF frequency for this modulator is in agreement with the LF demodulator at the next adjacent upstream location. As a result, the recognition by the next power inserter 24 in FIG. 1 of its unique address results in status monitor therein being read for information which is then encoded on a carrier of frequency Fn. This LF signal is transmitted toward the head-end and enters the trunk cable at coupler 17. The signal continues on into power inserter 16 which, as stated, provides substantial isolation between its upstream and downstream ports so that the signal is coupled through network 20 into the LF demodulator at site modem 21. This information is then encoded on the carrier for retransmission by the LF modulator and is coupled back into the upstream side of the power inserter 16 for return to the head-end modem. It is to be noted that the LF carrier received at the head-end modem is a single frequency signal.

The site modem at each location decodes the portion of the received VHF carrier for its unique address. In the event that the address is in agreement with that assigned, the status monitor and modulation technique previously described take place. However, if upon demodulation the address is for a different location, the site modem is switched from reading the data of the status monitor at this location to receiving the demodulated information from the LF demodulator. This permits the flow of data upstream toward the head-end through a succession of power inserters without destroying the integrity of the information. The status monitor control 15 accepts this information as being from the location addressed so that received information indicative of a malfunction in the system identifies that location and repairmen can be sent directly to the repair site.

The system is shown in further detail in FIG. 2, wherein power inserter 16 is coupled between amplifiers 18 and includes a blocking capacitor 51 connected in series with the center conductor of the coaxial cable. A pair of VHF chokes 50 are connected to the center conductor on either side of the capacitor. Thus, low frequency isolation is inserted in the transmission line while the chokes prevent the passage of significant VHF signals into the power inserter. Since, as previously described, a portion of the VHF signal is utilized by the site modem to decode the address, resistors 52 and 53 are connected in series between the center conductor and ground. As a result, a portion of the VHF signal appears across resistor 53 and is coupled through capacitor 54 to the upstream output of inserter 16.

The coupling network 20 of FIG. 1 is shown comprising VHF coupling network 31 and LF coupling network 32. The VHF coupling network is connected to receive the signal from the upstream output of inverter 16 and is coupled to VHF demodulator 34, which decodes the VHF signal to determine the address code. The output of demodulator 34 is supplied to status monitor 22 which compares the received data to determine if it should go into its monitoring mode or, in the alternative, should permit the LF modulator 33 to operate on data received from a downstream power inserter location. If the address of this location is decoded, the status monitor receives the data from the sample and hold circuits 42, indicative of a number of localized parameters and provide data and power to the LF modulator 33. This modulator contains an oscillator operating at carrier frequency Fn. The output of modulator 33 is coupled to the upstream side of the LF coupling network 32 by the transformer through VHF coupling network 31 and the upstream choke 50 of the power inserter to the center conductor of the cable. Capacitor 51 prevents transmission of the LF signal in the downstream direction.

If the VHF demodulator produces a signal for a different address, the status monitor provides a control signal to modulator 33 enabling it to receive information from LF demodulator 35, shown as operating at frequency Fn1. In this case, the LF signal is propagating upstream and passes through the downstream choke of the power inserter and through the VHF coupling network to the transformer in LF coupling network 32. The local oscillator of demodulator 35 operates at the same frequency Fn1 as the frequency of the LF modulator in the next adjacent downstream location.

The power module 23, shown in FIG. 1, includes a power supply transformer 40 which is coupled to the utility line at this location and relies on it for ac power. This transformer has its input and output terminals monitored by the sample and hold circuits for the status monitor. In addition, the localized battery supply is coupled to inverter 41 contained in the power module which provides a 60-cycle signal to the transformer for powering the equipment at this location, if necessary. The output of the inverter is also sampled as well as the standby battery voltage. In addition, the circuits 42 may continually sense the status of the equipment temperature and its closure mechanism to indicate if it has been opened or tampered with. The particular quantities being monitored at each location are determined by the system environment. In practice, the large capacitor 56 coupling the networks to ground can be eliminated since the power supplies themselves provide a low impedance path to ground for these signal frequencies.

The ability to utilize the present invention in connection with presently installed and operating CATV systems can be readily noted from the fact that existing power inserter apparatus can be removed and this invention substituted therefor without requiring further severing of the transmission line or an increase in the number of power supply locations. It should be noted that the next power inserter module containing this equipment and utilized downstream would have an LF modulator operating at the Fn1 frequency and an LF demodulator having an oscillator operating at the Fn2 frequency. This is to ensure separation between monitoring points. While additional frequencies could be utilized if desired, the use of three frequencies has been found satisfactory in embodiments tested and operated on existing CATV systems. The components of the power inserter module, shown in FIG. 2, can be constructed utilizing commercially available components. The particular constructional features utilized in one embodiment of the invention are shown in the following figures.

In FIG. 3, the VHF demodulator is shown including a band-pass filter 60 for receiving the VHF FM coded signal which has a typical frequency of 100.7 mHz with a nominal band of 75-110 mHz. The output from the filter is amplified and supplied to mixer 61 which receives the output of local oscillator 62 operating at a frequency of 90 mHz. Thus, the mixer output is at a nominal 10.7 mHz and is supplied to an IF filter and then to an amplifier 63 which detects the FSK coded data and provides it to data amplifier 64. A signal indicative of the presence of a carrier is supplied to amplifier 65 to show that the VHF signal has been received.

The LF demodulator is shown in FIG. 4 as comprising a channel filter 67 for receiving the LF signal from coupling network 32 of FIG. 2. The signal is amplified and supplied to data detector 68 which provides a data signal output from amplifier 69 and a carrier detection signal at the output of amplifier 70. The carrier detection signal, as is the case with the VHF present signal, can be utilized to control the operation of the LF modulator, either directly or through the status monitor. Since the LF modulator, utilized on the upstream side of the coupling network, must be responsive either to data from its status monitor in event this location has been addressed or to data from its LF demodulator for the retransmission of data received from a downstream location, the LF modulator includes a data selector switch circuit 71. The switch 71 is a double-pole, double-throw switch controlled by the status monitor at this location. As previously noted, recognition by the status monitor of the receipt of an address identifying this location causes the monitor to disable the input from the LF demodulator and provide its own data for transmission toward the head-end. In either case, the output of the switch, which consists of data to be transmitted, is provided to frequency synthesizer 72 which is coupled to crystal oscillator 73. The crystal oscillator frequency is one of three to be utilized throughout the system. The output of the synthesizer is an FSK signal which passes through filter 73 to amplifier 74 and then is supplied to the upstream transformer of the low-frequency coupling network 32. As shown, the active components receive power from the site equipment.

A series of representative wave-forms of signals found at various places throughout the embodiment are shown in FIG. 6, wherein wave-form A is the VHF carrier at the head-end modem containing FSK modulation to indicate address code. This wave-form also appears at the output of the VHF coupling network 31 in FIG. 2. Wave-form B is a typical signal from status monitor control 15 causing the head-end modem to provide the modulation in wave-form A. Wave-form B also corresponds to the output of VHF demodulator 34. The LF modulated signal return to the head-end modem is shown by wave-form C which corresponds to the output of LF modulator 33 of FIG. 2. The corresponding modulation of the signal is shown in wave-form D. A typical received LF signal, provided by coupling network 32 to demodulator 35, is shown by wave-form E. It is to be noted that the frequency of wave-form C is different than the LF signal transmitted from the downstream location shown by wave-form E. The signal attenuation is shown by the difference in magnitude of the wave-forms C and E, which are in the volt and mvolt range, respectively. The carrier detection signal is a 5 v square wave shown in wave-form F and is coupled from demodulator 35 to modulator 33. The wave-form G shows the 60-cycle square wave having an approximate magnitude of 60 VRMS which is introduced through the power supply transformer and the power inserter chokes to the cable system. Thus, the power inserter introduces both upstream and downstream power through its chokes 50.

Referring back to FIG. 2, the power supply transformer is typically a ferro transformer with separate windings for the 60-cycle ac power and the 60-cycle square wave from the inverter. The absence of ac power from the utility line supply can be sensed to switch over to the inverter output. This switching operation can be provided by the control circuits 42 sensing the absence of power from the transformer output. While the embodiment of FIG. 2 has shown separate cores in the coupling network 32, it is to be noted that hybrid transformers utilizing a single core may be employed if desired. Also, the obtaining of a low level VHF signal in the power inserter module through the use of resistors and capacitors can be replaced with a power splitter, recognizing that additional losses will be introduced as a result thereof. In the case of the use of a signal splitter or directional coupler, the VHF signal is down 20 db from the head-end input of the module and this may not be acceptable in certain applications.

While the above description has referred to specific a embodiment of the invention, it is to be noted that many modifications and variations may be made therein without departing from the scope of the invention as claimed.

What I claim is:

1. Apparatus for monitoring and transmitting status of components at remote locations in a communications system, said system transmitting information signals and address codes within a frequency band from a head-end to a plurality of spaced utilization circuits, said apparatus comprising:
   (a) high frequency demodulating means for recovering said address information at each said remote location;
   (b) status monitoring means for storing data indicative of component status at each said remote location and providing same upon being addressed;
   (c) low frequency modulating means for encoding a first carrier at a first frequency with data from status monitoring means in said system;
   (d) first means for coupling said low frequency modulating means to the head-end whereby said first carrier is transmitted to said head-end;
   (e) low frequency demodulating means for decoding a second carrier at a second frequency and recovering data from other of said remote locations, said demodulating means being coupled to said low frequency modulating means for supplying data thereto; and
   (f) second means for coupling said low frequency demodulating means to other of said remote locations for receiving low frequency signals therefrom.

2. Apparatus in accordance with claim 1 further comprising a power supply module located at each remote location for supplying power to said communications system.

3. Apparatus in accordance with claim 1 further comprising signal splitting means for receiving said information signals and address codes and supplying a portion thereof to said high frequency demodulating means.

4. Apparatus in accordance with claim 1 further comprising means for providing low frequency signal isolation at said remote locations whereby the low frequency signal received from the head-end is isolated from the signal received from further remote locations, said isolation means being coupled to said first and second means for coupling.

5. Apparatus in accordance with claim 4 further comprising first and second high frequency impedance means coupled between said isolation means and said first and second means for coupling, and further comprising signal splitting means for receiving said information signals and address codes and supplying a portion thereof to said high frequency demodulating means.

6. Apparatus in accordance with claim 5 further comprising a power supply module coupled to said first and second impedance means for supplying power therethrough to said system.

7. Apparatus in accordance with claim 6 wherein said power supply module includes a transformer coupled to an external power supply and to a standby power supply.

8. Apparatus in accordance with claim 4 further comprising data selection means coupled between said status monitoring means and said low frequency modulating means and responsive to receipt of the address information for controlling data provided to said low frequency modulating means.

9. In a communications system of the type wherein VHF signals are transmitted from a head-end to a multiplicity of users at different locations via a single transmission line, a status monitoring system for placement at remote locations along said cable which comprises:
  (a) head-end modem means for encoding address signals on said VHF signal and decoding low frequency signals received thereby; and
  (b) a plurality of power inserters spaced along said transmission line, each of said power inserters being coupled to an external power supply and comprising:
    (i) VHF demodulating means for receiving a VHF signal transmitted from the head-end and recovering address information therefrom;
    (ii) status monitoring means for storing data indicative of local conditions and providing same upon being addressed;
    (iii) low frequency modulating means for encoding a first carrier signal with data from a status monitoring means;
    (iv) low frequency demodulating means for decoding a second carrier from another power inserter and recovering data therefrom, said demodulating means being coupled to said modulating means for supplying data thereto; and
    (v) means for coupling the low frequency modulating and demodulating means to said transmission line.

10. The invention of claim 9 wherein said system further comprises power inserters utilizing low frequency modulating and demodulating means having first, second and third carrier signals of different frequency, each inserter being located adjacent inserters containing modulating means with different carrier frequencies.

11. The invention of claim 10 wherein each power inserter includes data selection switch means for controlling data flow to said low frequency modulating means from the status monitoring means and the demodulating means in response to the received address information.

12. The invention of claim 11 wherein said means for coupling includes first coupling means connected between the transmission line and said modulating means and second coupling means connected between the transmission line and said demodulating means.

13. The invention of claim 12 wherein each power inserter further comprises low frequency isolation means connected in said transmission line between said first and second coupling means.

14. The invention of claim 13 wherein each power inserter further comprises signal splitting means coupled between said transmission line and the VHF demodulating means for removing a portion of the VHF signal.

15. The invention of claim 14 wherein each power inserter further comprises power supply means coupled to said first and second coupling means for introducing power into said transmission line.

* * * * *